(12) United States Patent
McCulloch

(10) Patent No.: US 6,435,216 B2
(45) Date of Patent: Aug. 20, 2002

(54) CHOKE RESTRICTOR DEVICES AND METHODS

(75) Inventor: Stephen McCulloch, Katy, TX (US)

(73) Assignee: Wood Group Pressure Control, Limited, Houston, TX (US)

( * ) Notice: Subject to any disclaimer, the term of this patent is extended or adjusted under 35 U.S.C. 154(b) by 0 days.

(21) Appl. No.: 09/756,425

(22) Filed: Jan. 8, 2001

(51) Int. Cl.[7] ............................................. F15D 55/00
(52) U.S. Cl. ............................................ 138/42; 138/39
(58) Field of Search .................................... 138/39, 42

(56) References Cited

U.S. PATENT DOCUMENTS

| | | | | |
|---|---|---|---|---|
| 3,693,329 A | * | 9/1972 | Willis | 55/457 |
| 4,244,440 A | * | 1/1981 | Matta et al. | 181/213 |
| 4,466,741 A | * | 8/1984 | Kojima | 366/339 |
| 4,747,697 A | * | 5/1988 | Kojima | 366/339 |
| 4,839,038 A | * | 6/1989 | McLain, II | 210/137 |
| 5,312,083 A | | 5/1994 | Ekman | |
| 5,529,093 A | * | 6/1996 | Gallagher et al. | 138/44 |
| 5,575,561 A | * | 11/1996 | Rohwer | 366/336 |
| 5,664,760 A | * | 9/1997 | Army, Jr. et al. | 251/118 |
| 5,988,586 A | * | 11/1999 | Boger | 251/127 |

OTHER PUBLICATIONS

Richter, R: "Hochverschleissfeste Stellventile" VGB Kraftwerkstechnik, VGB Kraftwerkstechnik GMBH, Essen, De, vol. 77, No. 6. Jun. 1, 1997, pp. 476–480, XP000656701 ISSN: 0372–0575, figure 2 (Translation of relevant portions of reference included).

* cited by examiner

*Primary Examiner*—John Fox
(74) *Attorney, Agent, or Firm*—Shawn Hunter; Bracewell & Patterson, L.L.P.

(57) ABSTRACT

Flow enhancing restrictors are located within a fluid conduit to provide pressure reduction and flow enhancement. The restrictors may be used in combination with a conventional choke valve or as a stand-alone pressure reduction means. Alternative exemplary embodiments for flow enhancers are described. Each of the flow enhancers has a generally cylindrical base with at least one fluid passage disposed therethrough. Each of the flow enhancers also provides a dome that projects upwardly from the center of the base to assist in directing fluid flow and receiving the abrasive forces associated with the fluid.

20 Claims, 5 Drawing Sheets

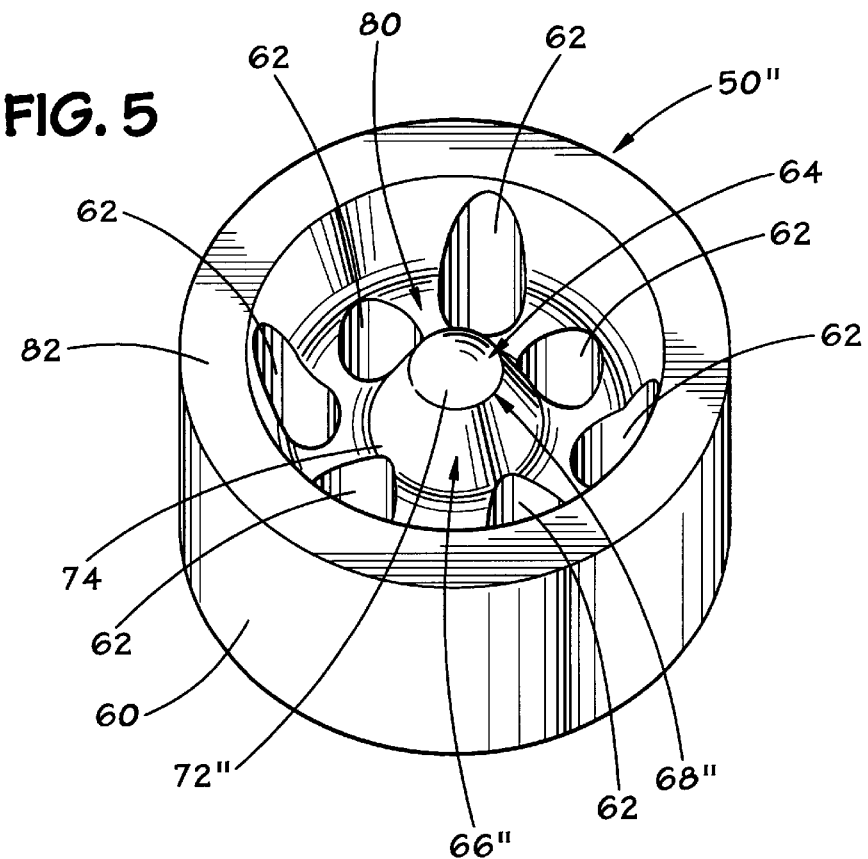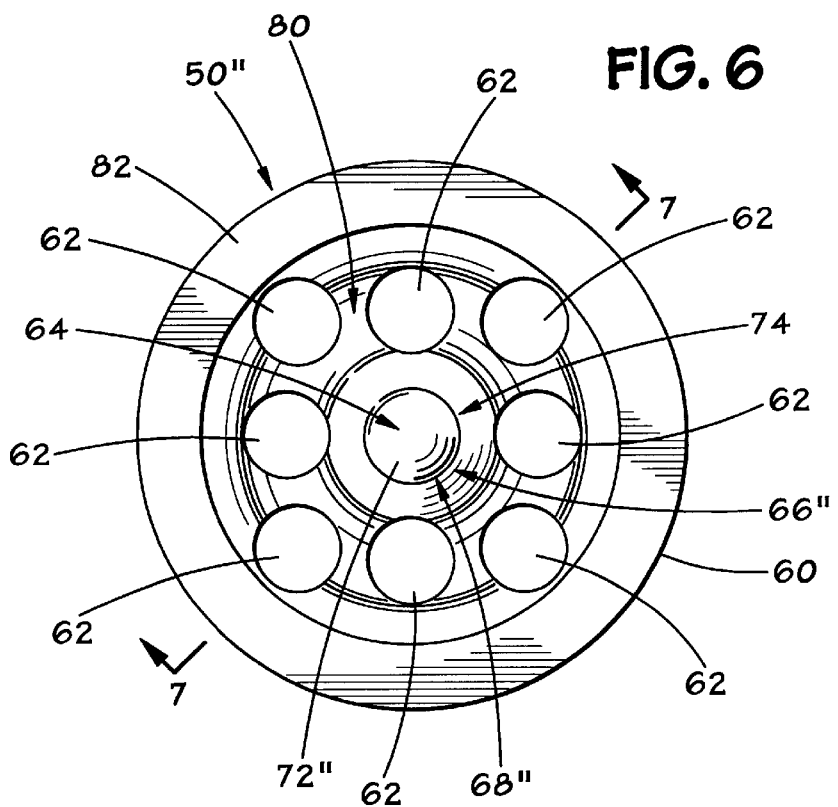

CHOKE RESTRICTOR DEVICES AND METHODS

This application claims the priority of provisional UK patent application no. 0000279.0 filed Jan. 8, 2000.

BACKGROUND OF THE INVENTION

1. Field of the Invention

The present invention relates to devices and methods for reducing fluid pressure and velocity and enhancing fluid flow within a pipe or other flowbore. The devices and methods of the present invention have a particularly useful application in pipelines where crude oil or natural gas is flowed which contains abrasive agents.

2. Description of the Related Art

Production pipelines and conduits are used to transmit hydrocarbons, in the form of crude oil or natural gas, from a producing well to a storage facility or distribution point. One important aspect to the design for systems of these conduits is the ability of the conduits to manage fluid pressure and enhance the flow of fluid within the conduit. When hydrocarbons first leave the well and enter the conduit they are often under vary high pressure, and this pressure must be quickly and efficiently reduced.

A related problem is that the hydrocarbons, particularly natural gas, carry sand and other solids that will quickly abrade and/or clog flow reducing restrictions in the conduit. Efficient pressure reduction is necessary to preclude damage to the more vulnerable portions of the pipeline system. In addition, it is important that the pressure reduction means itself is highly resistant to abrasion and other wear damage that will be inflicted by the solids.

It would be desirable to have devices and methods that address the problems of the prior art.

SUMMARY OF THE INVENTION

Arrangements are described wherein flow enhancing restrictors are located within a fluid conduit to provide pressure and velocity reduction as well as flow enhancement. The flow enhancers may be used in combination with a conventional choke valve or as a stand-alone pressure reduction means. Alternative exemplary embodiments for flow enhancers are described. Each of the flow enhancers has a generally cylindrical base with at least one fluid passage disposed therethrough. Each of the flow enhancers also provides a dome that projects upwardly from the center of the base to assist in directing fluid flow and receiving the abrasive forces associated with the fluid. The dome, in each of the embodiments, assists in directing fluid into the fluid passages of the flow enhancer and also provides a wear surface upon which abrasives are recieved.

It is an object of this invention to provide an efficient and long-lasting method of achieving a pressure drop within a fluid conduit, particularly where highly abrasive fluids are being transmitted. It is a further object of this invention to provide a fluid flow enhancer device that is highly resistant to abrasive action.

BRIEF DESCRIPTION OF THE DRAWINGS

FIG. 5 is an isometric view of a third, and most preferred, embodiment for a fluid flow enhancer constructed in accordance with the present invention.

FIG. 6 is a plan view of the fluid flow enhancer depicted in FIG. 5.

DETAILED DESCRIPTION OF PREFERRED EMBODIMENTS

Figure 1:
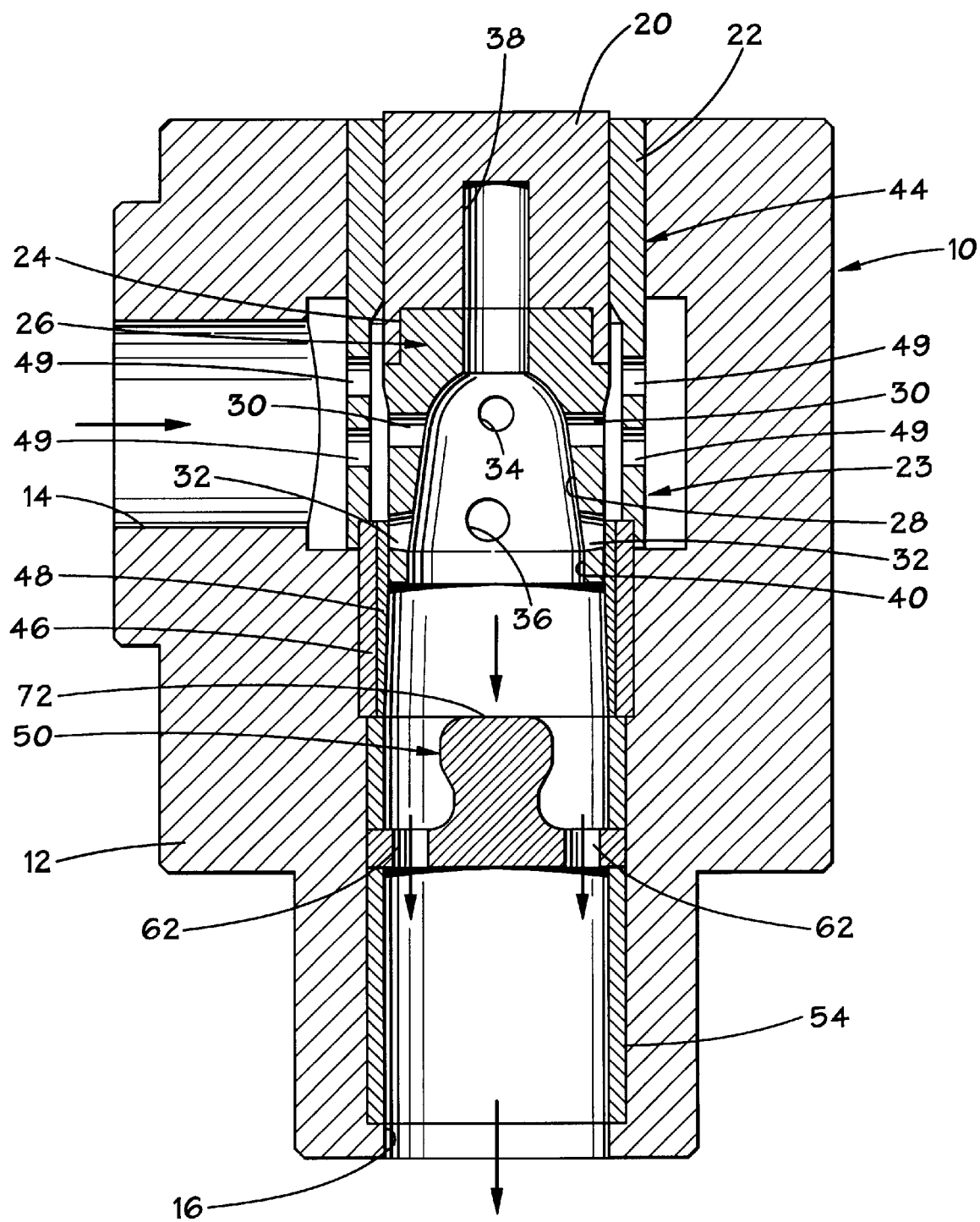
FIG. 1 is a side cross-sectional view of an exemplary choke valve of the type used within pipelines which incorporates a fluid flow enhancer constructed in accordance with the present invention.

Referring first to FIG. 1, there is shown an exemplary choke valve 10 that incorporates a fluid flow enhancer as contemplated by the present invention. The choke valve 10 includes a valve body 12 that is typically constructed of a strong and chemically resistant metal. The body 12 defines a fluid inlet 14 and fluid outlet 16 which are set at right angles to one another thereby providing an elbow configuration for the valve body 12.

The fluid outlet 16 houses, at its upper end, a stem and tip assembly 20 which is concentrically located within a flow cage 22 that is set within the body 12. The stem and tip assembly 20 may be moved linearly within the body 12 by a manual handwheel, via an automated control, or using other techniques known in the art. Linear movement of the stem and tip assembly 20 actuates the choke mechanism 23 of the choke valve 10. The choke mechanism 23 is used to regulate fluid flow within the valve 10 and includes a tip member 26 and surrounding flow cage 22.

The lower end of the stem and tip assembly 20 is secured by autofrettage at interface 24 to a tip member 26. The tip member 26 is a substantially cylindrical piece having a central dome-shaped chamber 28. The central chamber 28 is surrounded by a number of fluid flow openings within the tip member 26. The fluid flow openings are of differing sizes and are positioned in mutual opposition to one another so that openings of equal sizes are located directly across from one another. For example, fluid flow openings 30 are of equal sizes and are located antagonistically from one another. The same is true of openings 32. Openings 34 (one shown) and 36 (one shown) have the same arrangement. A pressure balance chamber 38 is defined within the domed geometry of the tip member 26 and the stem and tip assembly 20. The chamber 28 has an enlarged lower opening 40 that is located across from the pressure balance chamber 38.

The flow cage 22 radially surrounds the tip member 26 and is retained within the valve body 12 by a bonnet (not shown) onto a valve seat 46 at its lower end. A valve seat insert 48 is disposed within the valve seat 46. The flow cage 22 is a tubular member that contains a plurality of radial fluid communication openings 50, four of which are shown. The tip member 26 can be moved upwardly and downwardly within the body 12 by linear movement of the stem and tip assembly 20 to modulate fluid entry into the chamber 28. Such rotation will align the fluid openings 49 in the flow cage 22 with various fluid openings 30, 32, 34, 36 in the tip member 26 to permit different flow rates into the choke mechanism 23, as those of skill in the art will appreciate.

A fluid flow enhancer 50 is located within the fluid outlet 16 below the valve seat 46. The flow enhancer 50 is retained within the outlet 16 by a pair of bushings 52 and 54 that are located concentrically on either side of it. Other retention means may also be used. It is pointed out that, while the described embodiment illustrates a flow enhancer 50 incorporated within the valve 10, the flow enhancer might also be of the design of flow enhancer 50' or 50", which will be described shortly or another type of flow enhancer falling within the scope of the claims.

In operation, fluid enters the fluid inlet 14 and encounters the choke mechanism 23. Fluid enters the fluid openings 49 of the flow cage 22 and one or more of the fluid openings of the tip member 26. Because the fluid is under pressure, the opposing openings create opposing fluid jets within the chamber thereby effectively creating a fluid pressure drop. The fluid exits the choke mechanism 23 through the opening 40 and is directed along the fluid outlet 16 to the flow enhancer 50. As the fluid passes through the fluid passages 62 of the flow enhancer 50, a fluid pressure drop and fluid velocity reduction is achieved. If desired, there may be multiple flow enhancers 50 located in a stacked relation downstream from the choke mechanism 23.

There is a particular advantage in locating one or more flow enhancers 50 immediately downstream from the choke mechanism 23. Fluid velocities within the flow cage 22 and tip 26 will be reduced. The introduction of a pressure drop across the one or more enhancers 50 means that the pressure drop through the choke mechanism 23 is reduced. Therefore, the choke mechanism 23 is also subjected to less wear and abrasion from solids. When the flow enhancer 50 is included downstream of the choke mechanism 23, adjustment will need to be made to the choke mechanism 23 to ensure adequate flow rate exits the flow enhancer 50. In other words, the choke mechanism 23 will have to be opened somewhat to compensate for the pressure reduction across the flow enhancer 50.

Figure 2:
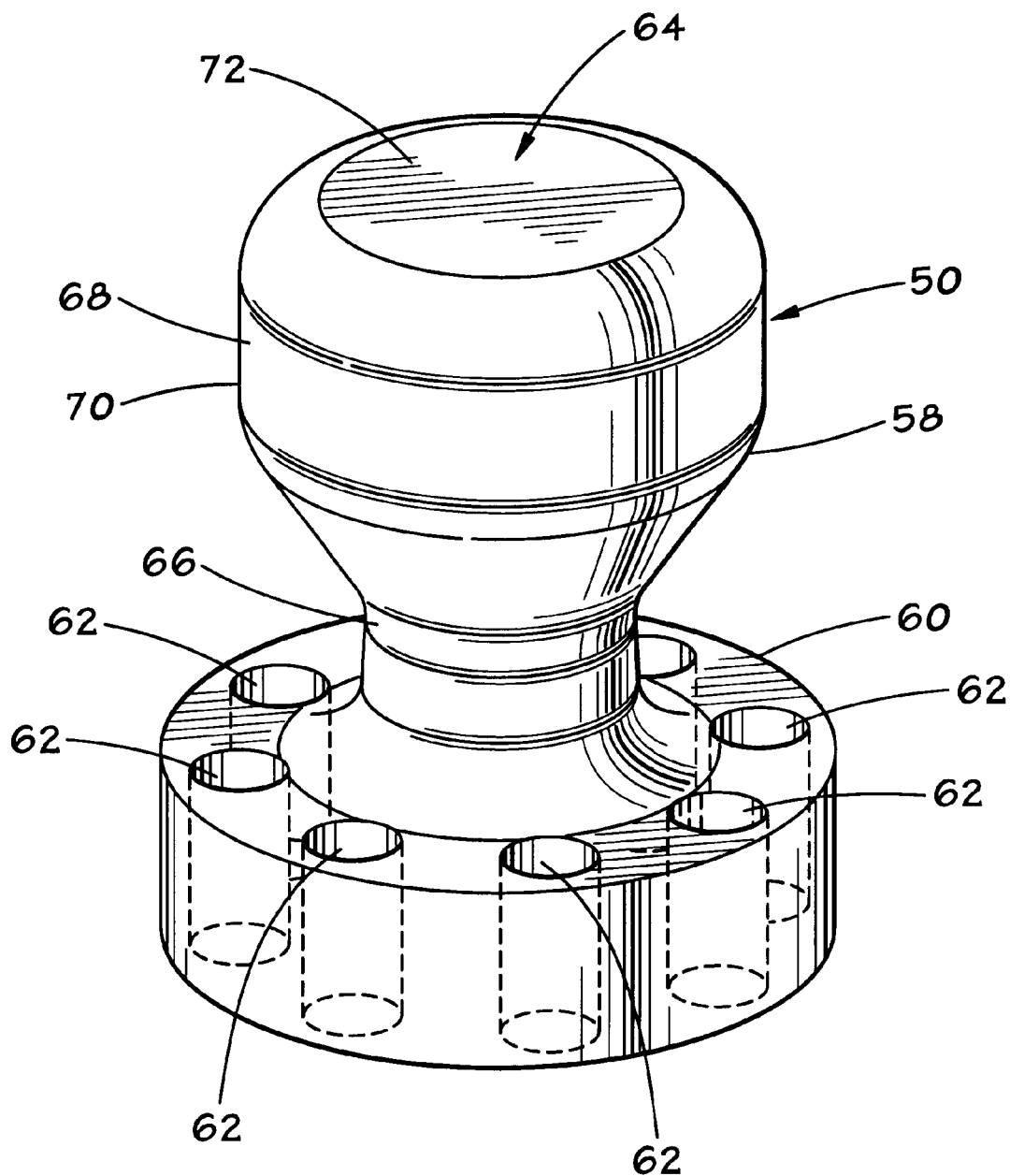
FIG. 2 is an isometric view of a first embodiment for a fluid flow enhancer.

The structure of the exemplary fluid flow enhancer 50 is better understood with reference to FIG. 2 wherein this component is shown apart from the check valve 10 and its structure may be seen in greater detail. The flow enhancer 50 has a unitary body 58 that is formed of a strong material that is resistant to chemicals and mechanical abrasion. Tungsten carbide and precipitation-hardened stainless steel are two examples of suitable materials. The body 58 has a substantially cylindrical base 60 having a diameter that is sized to fit within the interior diameter of a desired conduit. A plurality of fluid passages 62 penetrate axially and completely through the base 60. In current preferred embodiments, there are eight fluid passages 62, although depending on flow conditions there may be more or fewer than that number. The diameter of the fluid passages must be sufficient at least for any solids that might be encountered to pass through the passages 62 without obstruction. Preferably, the passages 62 have a much greater diameter than necessary for that purpose. However, the diameter of the passages 62 is typically established to provide the pressure drop necessary across the flow enhancer.

A dome 64 projects upwardly from the center of the cylindrical base 60. The dome 64 has a smaller diameter than the base 60 so that fluid may flow around the dome 64. In this embodiment, the dome 64 includes a reduced diameter lower neck section 66 and an enlarged upper head section 68 having a radial outer surface 70 that is substantially flat. The upper head section 68 also presents a substantially flat upper surface 72.

The geometry of the components of the flow enhancer body 52 is important in terms of its functions for flow control. As FIG. 1 indicates, fluid flow approaches the flow enhancer 50 from the upper end. Thus, the flat upper surface 72 advantageously encounters the majority of abrasive material that is carried in the fluid. Because the upper surface 72 is substantially flat, abrasive particles impinge normally to the surface 72. Therefore, the amount of abrasion and wear upon the upper surface 72 and the flow enhancer body 52 as a whole is minimized.

Figure 3:
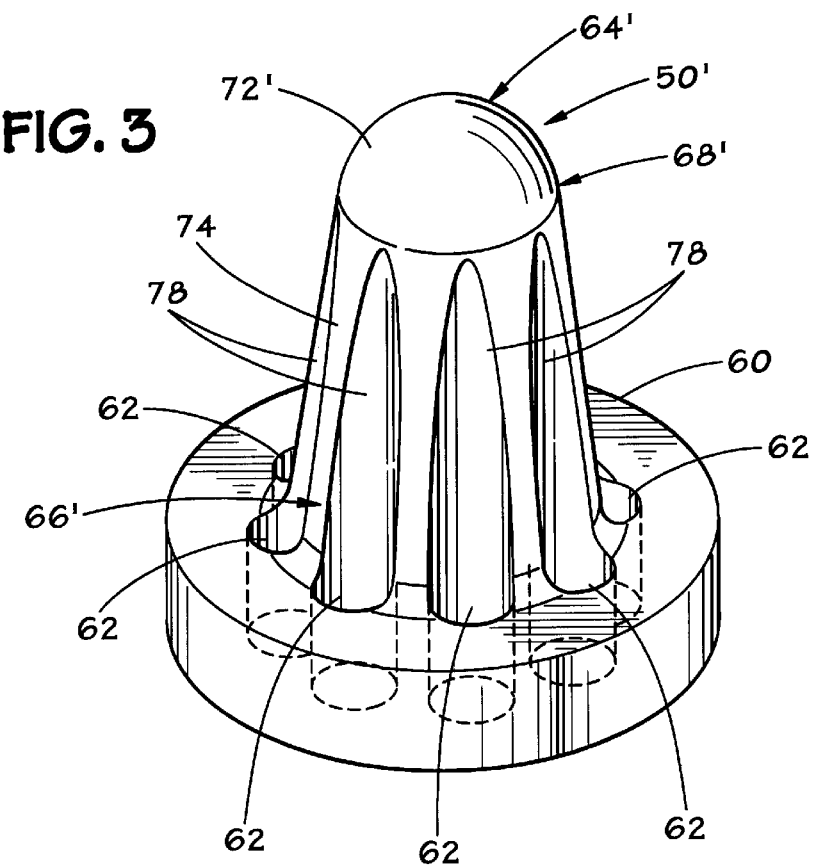
FIG. 3 is a side isometric view of a second embodiment for a fluid flow enhancer.
Figure 4:
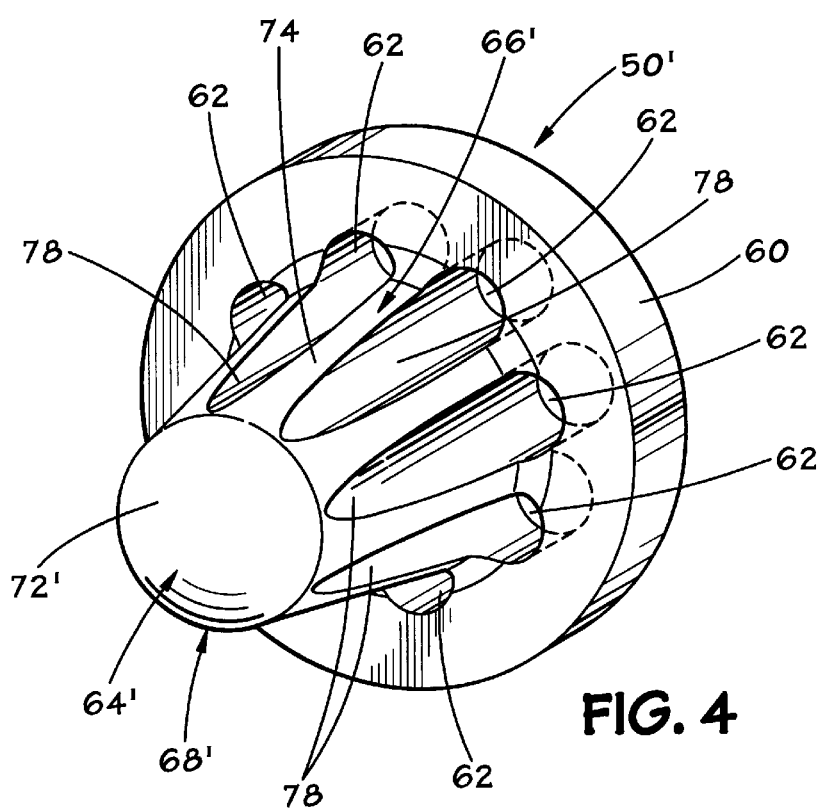
FIG. 4 is a further isometric view of the fluid flow enhancer illustrated in FIG. 3.

FIGS. 3 and 4 depict an alternative embodiment for a fluid flow enhancer 50'. For clarity, like components among the alternative embodiments are numbered alike. In this embodiment, the dome 64' has a tapered side wall 74 extending from the rounded upper surface 72' downward to the base 60 so that the head section 68' is smaller than the neck section 66'. There are indentations 78 in the tapered side wall 74 that increase in width but decrease in depth as the base 60 is approached. The indentations 78 extend upwardly from the side walls of the fluid passages 62 and, in use, provide an increased wear area upon which abrasives can act. This feature extends the life span of the fluid flow enhancer 50' in resisting abrasion and wear around the openings 62. A primary advantage to this embodiment is that wear patterns are more balanced as compared to the flow enhancer 50 described earlier because the radially internal portions of the fluid openings 62 of flow enhancer 50' are provided a greater exposure to the passing fluid. Thus, wear upon the flow enhancer 50' is more even, and the wear enhancer 50' should not be required to be replaced as often.

Figure 7:
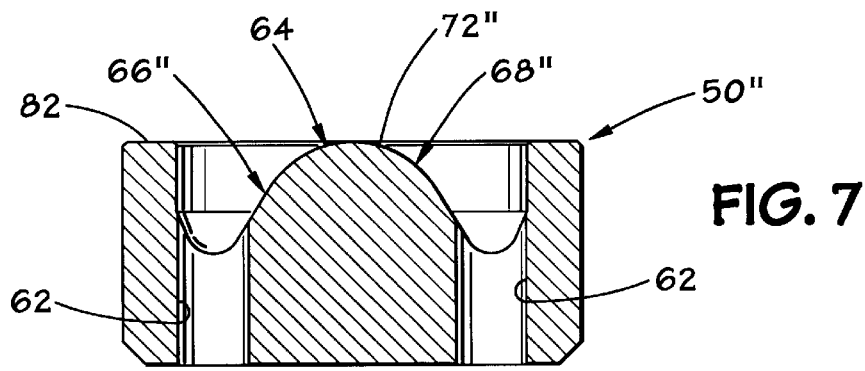
FIG. 7 is a side cross-section of the fluid flow enhancer shown in FIGS. 5 and 6.

FIGS. 5–7 illustrate a third embodiment for a fluid flow enhancer 50" that is currently the most highly preferred version. Fluid flow enhancer 50" includes a recessed central valley 80 that results in the base 60 presenting a raised peripheral rim 82. The dome 64 projects upwardly from the recessed valley 80 but has a reduced height so that its rounded upper surface 72" is approximately level with the top of the rim 82 (see FIG. 7). In this embodiment as well, the dome 64 has a reduced diameter head section 68" and a neck section 66" with a somewhat larger diameter, thereby resulting in a tapered side wall 74. The advantage associated with this embodiment of fluid flow enhancer is that the wear patterns surrounding the inlets of the fluid passages 62 are the most balanced as between all three of the flow enhancers 50, 50' and 50". As a result, it is expected that this design will have the longest life span in operation.

Figure 8:
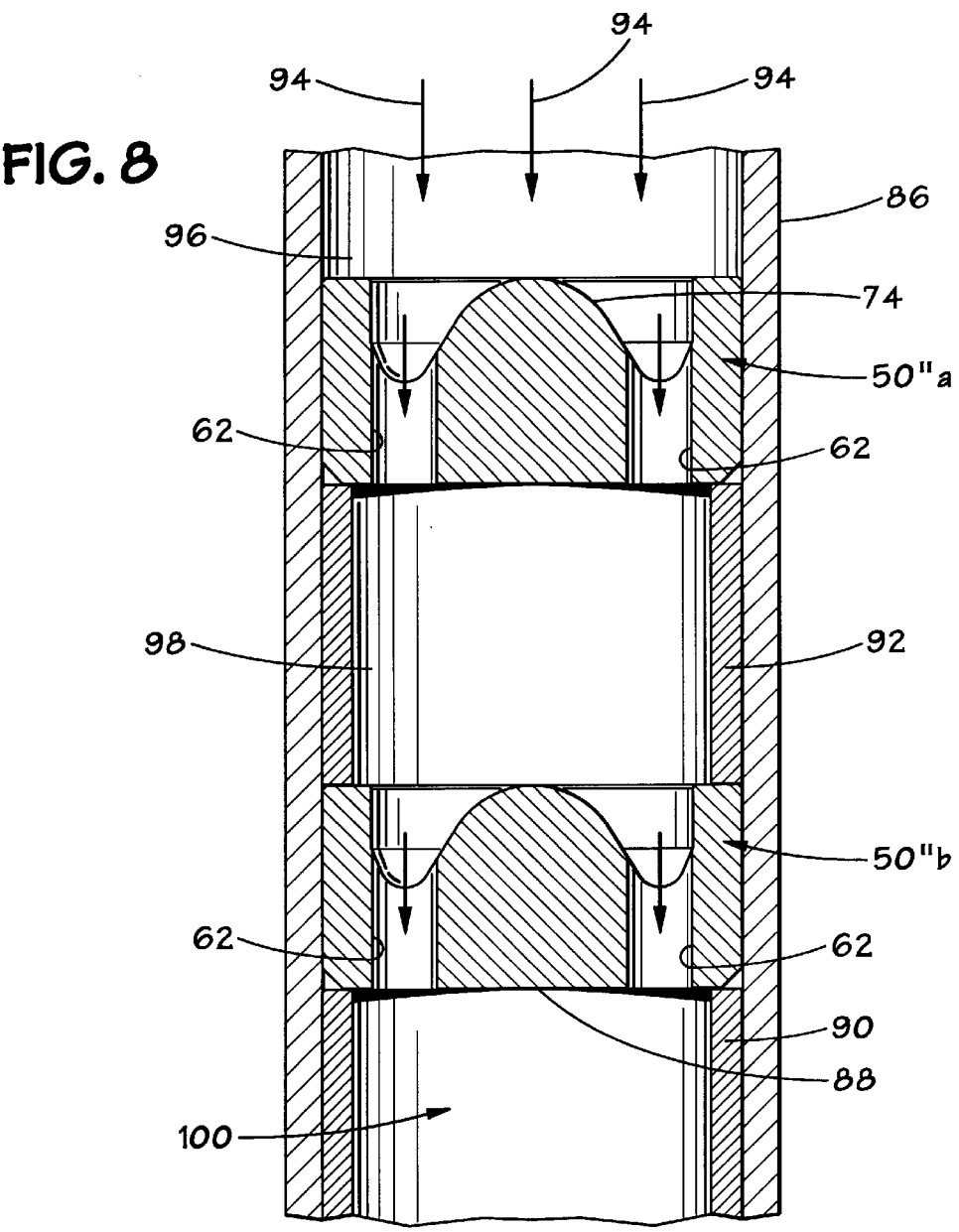
FIG. 8 illustrates staged enhancers located within a fluid flow conduit to achieve a greater pressure drop.

FIG. 8 illustrates a pair of flow enhancers 50"a and 50"b positioned in a staged or tandem relation within a flow conduit 86. It is noted that the flow conduit 86 may be representative of a location immediately downstream from a choke valve choke mechanism, such as the choke mechanism 23 described earlier. Alternatively, the flow conduit 86 may be representative of any location within a pipe or other fluid conduit wherein it is desired to reduce fluid pressure. In that case, the flow enhancers 50" are used as a stand-alone measure for fluid pressure reduction. The lower end 88 of the flow enhancer 50"b rests against a seat member 90 that is secured within the conduit 86. A tubular spacer element 92 is disposed between the upstream flow enhancer 50"a and the downstream flow enhancer 50"b.

In operation, fluid is flowed through the conduit 86 in the direction indicated by the arrows 94. In the upper portion 96 of the conduit 86, the fluid is under high pressure. Upon encountering the upstream flow enhancer 50"a, the fluid is directed through the restricted diameter fluid passages 62 of the flow enhancer 50"a, its passage being assisted by the tapered side wall 74. Because a pressure drop occurs across the upper flow enhancer 50"a, the fluid is at a reduced pressure when it resides within area 98 of the conduit 86.

The fluid then encounters the downstream flow enhancer 50"b and is directed through its fluid passages 62. A second, staged pressure reduction occurs across the downstream flow enhancer 50"b and, therefore, the fluid is at a further reduced pressure in area 100 of the conduit 86. If desired, additional flow enhancers may be located downstream of flow enhancer 50"b to provide further staged pressure reductions.

While the invention has been shown in only some of its forms, it should be apparent to those skilled in the art that it is not so limited, but is susceptible to various changes without departing from the scope of the invention.

What is claimed is:

1. A fluid flow enhancer for reducing fluid pressure within a fluid conduit, the fluid flow enhancer comprising:
   a generally cylindrical base;
   a dome extending upwardly from a central portion of the base; and
   a plurality of fluid flow passages substantially surrounding the dome and disposed axially through the base.

2. The fluid flow enhancer of claim 1 wherein the dome presents a lower reduced diameter neck section and an upper enlarged diameter head section.

3. The fluid flow enhancer of claim 2 wherein the upper enlarged diameter head section presents a substantially flat upper surface.

4. The fluid flow enhancer of claim 1 wherein the dome presents a rounded upper surface.

5. The fluid flow enhancer of claim 1 wherein the dome presents an enlarged diameter neck section and a reduced diameter head section.

6. The fluid flow enhancer of claim 5 wherein the dome further comprises a tapered side wall having a plurality of indentations that adjoin the fluid openings.

7. The fluid flow enhancer of claim 1 wherein the base presents an upwardly extending peripheral rim that defines a valley radially within.

8. The fluid flow enhancer of claim 7 wherein the upper surface of the dome is approximately level with the rim.

9. The fluid flow enhancer of claim 1 wherein the dome presents an upper wear surface for receiving abrasives.

10. A fluid flow enhancer for reducing fluid pressure within a fluid conduit comprising:
    a. a base that is generally cylindrical in shape;
    b. a dome that extends upwardly from the base and presents an upper wear surface for receiving abrasives; and
    c. a plurality of fluid flow passages disposed axially through the base.

11. The fluid flow enhancer of claim 10 wherein the fluid flow passages have a substantially round cross section.

12. The fluid flow enhancer of claim 10 wherein there are eight flow passages.

13. The fluid flow enhancer of claim 10 wherein the base further comprises:
    a. a peripheral rim, and
    b. a valley defined radially within the rim.

14. The fluid flow enhancer of claim 13 wherein the dome comprises a neck section having a first diameter and a head section having a second diameter, the second diameter being larger than the first diameter.

15. The fluid flow enhancer of claim 13 wherein the dome comprises a neck section having a first diameter and a head section having a second diameter, the second diameter being smaller than the first diameter.

16. The fluid flow enhancer of claim 10 wherein the upper wear surface is flat.

17. The fluid flow enhancer of claim 10 wherein the upper wear surface is rounded.

18. A fluid flow enhancer for reducing fluid pressure within a fluid conduit comprising:
    a. a base that is generally cylindrical in shape, the base having a raised peripheral rim and a valley that is defined radially within the rim;
    b. a dome that extends upwardly from the base and presents an upper wear surface for receiving abrasives, the dome comprising a head section upon which the upper wear surface is located and a neck section that interconnects the head section to the base; and
    c. a plurality of fluid flow passages disposed axially through the base.

19. The fluid flow enhancer of claim 18 wherein the fluid flow passages are axially disposed generally through the valley of the base.

20. The fluid flow enhancer of claim 18 wherein the fluid flow passages have a substantially round cross section.

* * * * *